United States Patent [19]

Grimes et al.

[11] 4,330,352
[45] May 18, 1982

[54] METHOD OF FORMING A METALLIZED DECORATIVE FILM LAMINATE

[75] Inventors: Whiteford Grimes, Weston, Conn.; Ronald A. Lombardi, New Windsor, N.Y.

[73] Assignee: Stauffer Chemical Company, Westport, Conn.

[21] Appl. No.: 137,654

[22] Filed: Apr. 7, 1980

Related U.S. Application Data

[60] Division of Ser. No. 36,953, May 7, 1979, which is a continuation of Ser. No. 826,219, Aug. 19, 1977, abandoned.

[51] Int. Cl.³ .......................... B41M 3/12; B44C 1/16
[52] U.S. Cl. .................................. 156/235; 156/239; 156/247; 156/249; 427/147; 427/148; 428/913; 428/914
[58] Field of Search ............... 156/233, 234, 239, 240, 156/235, 241, 247, 249; 427/147, 148; 428/40, 200–210, 344, 346, 349, 352, 354, 355, 913, 914

[56] References Cited

U.S. PATENT DOCUMENTS 4,012,552  3/1977  Watts .................................. 428/200

Primary Examiner—Bruce H. Hess
Attorney, Agent, or Firm—Richard P. Fennelly

[57] ABSTRACT

A decorative film laminate is disclosed comprising: (a) a substantially transparent plastic film; (b) a thin metallic layer having one side attached to one side of the film by means of an adhesive layer; and (c) a pressure sensitive adhesive layer attached to the other side of the metallic layer, said adhesive layer being optionally covered on its exposed surface by a release liner. The film laminate is formed by applying the metallic layer to one side of the plastic film by transfer lamination followed by attachment of the pressure sensitive adhesive layer, and, if desired, release liner, to the other side of the metallic layer.

3 Claims, 4 Drawing Figures

METHOD OF FORMING A METALLIZED DECORATIVE FILM LAMINATE

This is a division of application Ser. No. 36,953, filed May 7, 1979, which is a continuation of application Ser. No. 826,219 filed Aug. 19, 1977, now abandoned.

BACKGROUND OF THE INVENTION

1. Field of the Invention

The present invention relates to a metallized decorative film and a process for making it by applying the metallic film by transfer lamination. The decorative film can be used to apply decoration to a desired substrate, e.g., a motor vehicle.

2. Description of the Prior Art

Metallized decorative films which are suitable for exterior use and which contain a substantially transparent, plasticized film have been formed in the past by laminating the transparent film to a vacuum metallized film, e.g., a vacuum metallized polyester film, which is then overlaminated with a clear polyvinyl fluoride film which aids in protecting the polyester film from ultraviolet degradation. Such complex laminates are rather stiff and difficult to form into complex shapes and are subject to moisture degradation at the exposed edge of the lamination between the polyvinyl fluoride film and the polyester film.

Direct vacuum metallization of a flexible plastic film is difficult to accomplish since various ingredients in the film tend to "gas off" during the metallization process interfering with both the maintenance of the vacuum and the uniformity of the metal deposit. One solution to this problem has been the suggestion that a barrier layer of a long chain thermoplastic polyvinyl resin containing a large number of highly polar groups be placed over the plasticized resin and that this layer be metallized and then coated with a transparent film, U.S. Pat. No. 2,993,806 to E. M. Fisher et al. Another solution which has been proposed in U.S. Pat. No. 3,107,198 to L. E. Amborski et al. is to treat the metallized layer with a complex compound of the Werner type.

SUMMARY OF THE INVENTION

The present invention is a metallized decorative film laminate and the process for making it. The laminate comprises: (a) a substantially transparent plastic film; (b) a thin metallic layer having one side attached to one side of the plastic film by means of an adhesive layer; and (c) a pressure sensitive adhesive layer attached to the other side of the metallic layer, said adhesive layer being optionally covered on its exposed surface by a release liner. The film laminate is formed by applying the metallic layer to one side of the plastic film by transfer lamination followed by attachment of the pressure sensitive adhesive layer and, if desired, release liner to the other side of the metallic layer.

BRIEF DESCRIPTION OF THE DRAWINGS

Certain preferred embodiments of the present invention are shown in greatly enlarged cross-sectional view in the Drawings which accompany and form a portion of this specification wherein.

DESCRIPTION OF THE PREFERRED EMBODIMENTS

Figure 1:
FIG. 1 shows the substantially transparent plastic film to which the metallized layer is to be attached.

FIG. 1 shows the substantially transparent plastic film 1 which may be any conventional, substantially transparent and flexible film known to persons of ordinary skill in the art of fabricating decorative pressure sensitive products. The term "substantially transparent" as used herein is intended to encompass those plastic films which are transparent enough to allow a viewer to perceive the decorative effect generated by the metallic layer in the laminate of the present invention. The thickness of the film 1 can range from about 2 mils (0.05 mm.) to about 20 mils (0.5 mm.), and the film can be a homo- or copolymer of vinyl chloride (the preferred film material), a polyester resin, a cellulose resin, or the like. Films of this type are well known in the art and have been used heretofore in forming decorative laminates which differ in construction from the present laminate.

Figure 2:
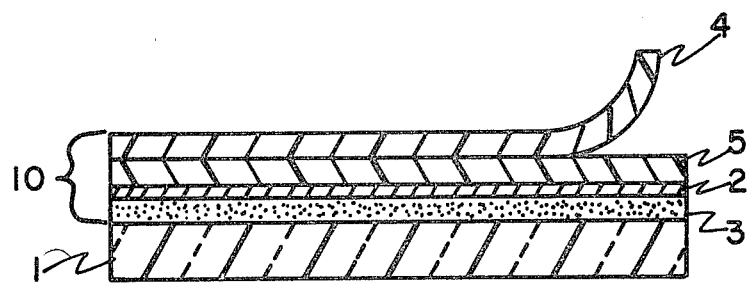
FIG. 2 shows the plastic film/metallic layer combination after the latter has been adhesively attached to the plastic film by transfer lamination and as the carrier film in the transfer laminate responsible for the transfer lamination step is being removed.

FIG. 2 shows the laminate subcombination that results when a thin metallic layer 2 is adhesively attached to the plastic film 1. This is accomplished by transfer laminating this layer 2 to the film 1 by means of a "metallized transfer laminate" which is indicated generally by the reference numeral 10 in FIG. 2. Such laminates are well known but have not hitherto been used to laminate thin metallic layers to the type of substantially transparent plastic film used herein to form decorative metallized laminates useful as decorative trim, for example, on such substrates as motor vehicles, and the like. Preferred metallized transfer laminates of this type are available under the trademark "Chromtex" from Kurz-Hastings, Inc., Philadelphia, Pa.

The metallized transfer laminate comprises an adhesive layer 3 attached to a thin metallic layer 2 which is bonded to a carrier film 4, preferably by means of a protective or release coating 5. The metallized transfer laminate 10 is applied to the substantially transparent film 1 in such a way so as to adhesively bond metallic layer 2 to film 1. The carrier film 4 in the metallized transfer laminate 10 is then stripped off as shown in FIG. 2.

The carrier film 4 may be formed of a suitable flexible material capable of being coated, if desired, by the resinous solution which constitutes the protective or release coating 5. Examples of suitable carrier films 4 are formed from polyethylene terephthalate, crystallized copolymers of polyethylene terephthalate and isophthalate, oriented polystyrene, polyvinyl fluoride, acetate coated paper, and polyolefins, such as polyethylene and polypropylene. The carrier film 4 can have a thickness of from about 0.5 mil (0.013 mm.) to about 5 mils (0.125 mm.)

The protective or release coating 5 is preferably included in the metallized transfer laminate 10 since it aids in stripping the carrier film 4 from the laminate construction after the metallic layer 2 has been adhesively bonded to transparent film 1. The release coating 5 may be formed by coating the carrier film 4 and is preferably a resinous solution comprising solvents which do not adversely affect the film 4 and an organic solute not normally compatible therewith. Some representative release coatings include the polyurethanes, silicones, phenol formaldehyde solutions, solvent systems of polyesters and combinations such as methyl methacrylate, ethylene terephthalate, and ethylene isophthalate and water and organic solvent systems of polyvinyl acetate and polyvinyl choloride. The coating used to form release layer 5 may be uniformly applied by conventional coating techniques, such as, direct roller coating, reverse roller coating or by flexographic or rotogravure coating. The release coating 5, when dried, constitutes a layer which, while not bonded to the carrier film 4 in any chemical sense, superficially adheres to it.

The metallic layer 2, which is attached, prefereably to the surface of release coating 5, may be formed of any metal such as gold, silver, aluminum, magnesium, titanium, nickel, zinc, copper, chromium, cobalt, selenium or the like. Metallic compounds as well as alloys can also constitute the layer. Aluminum or an aluminum alloy are often preferred for reasons of economy and durability. The thickness of this layer will generally range from about two or three millionths of an inch (about 500 to 750 Angstroms) to about fifty millionths of an inch (12,500 Angstroms). The films may be deposited on the release coating 5 by the known thermal evaporation or cathodic sputtering techniques as described in U.S. Pat. No. 2,993,806.

The nature of adhesive layer 3 in the metallized transfer laminate 10 will depend upon the character of the plastic film 1 to which it will be attached. Heat activatable adhesives that are compatible with plastic film 1 can be used and include rubberphenolic and polyester-isocyanate systems, polyurethane, and solutions of vinyl chloride/vinyl acetate, vinyl acetate/acrylate and vinyl acetate/maleate copolymers. Preferably, the selected adhesive will dry to a water-white clear film and remain clear even upon outdoor exposure.

Figure 3:
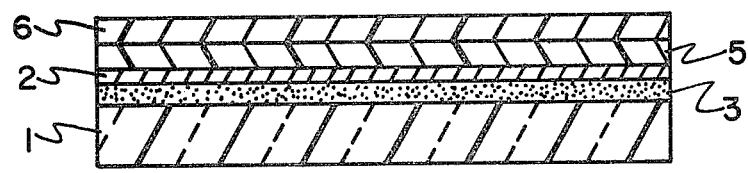
FIG. 3 shows the laminate from FIG. 2 after application of a tie coat to the protective or release coating remaining from the transfer laminate used in the previous step.
Figure 4:
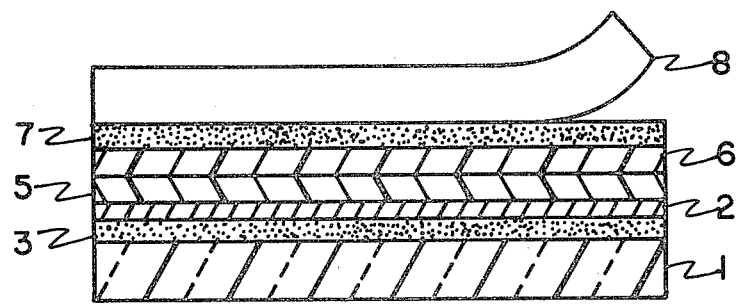
FIG. 4 shows a desired end product after a release liner and pressure sensitive adhesive have been attached to the tie coat in the laminate of FIG. 3.

Removal of the carrier film 4 from the metallized transfer laminate 10/plastic film 1 combination will leave release coating 5 exposed, if such a coating is present. When such a coating is in the transfer laminate 10 for its release properties, it may be necessary to apply a resinous tie coat 6 (as shown in FIG. 3) to the exposed surface of release coating 5 in order to provide a site for later secure attachment of a layer of pressure sensitive adhesive 7 and, if desired, a release liner 8 (as shown in FIG. 4). Tie coats which are compatible with and thus have good anchorage to both release coating 5 and the desired pressure sensitive adhesive 7 will adequately serve the intended purpose. The tie coat should also possess good cohesive strength so that it will not be a site of internal failure in the final laminate. Polyurethane tie coats having the above-described compatibilities and cohesive strength are one representative class of tie coats that may be used.

FIG. 4 in the Drawings shows a preferred and finished laminate of the present invention wherein a layer of pressure sensitive adhesive 7 and a release liner 8 have been applied to the exposed surface of the tie coat 6.

The pressure sensitive adhesive 7 which is used in the present laminate may also be any of the pressure sensitive adhesives which are known and conventionally used in the art. As for the applicable tacky, pressure sensitive adhesives which may be utilized in the product of this invention, they may be based upon any elastomeric material such as: (1) natural rubber; (2) synthetic rubbers including, for example, styrene-butadiene copolymers, polyisobutylene, butadiene-acrylonitrile copolymers, polychloroprene, and polyisoprene; (3) acrylic copolymers containing at least 50 percent, by weight, of a $C_9$–$C_{12}$ alkyl acrylate ester, i.e., an alkyl acrylate ester wherein the alkyl group contains from 4 to 12 carbon atoms, together with a hardening comonomer, for example, vinyl acetate, styrene, methyl methacrylate, methyl acrylate, ethyl acrylate, ethyl methacrylate and vinyl chloride; and (4) polymers of alkyl vinyl ethers such, for example, as polymethyl vinyl ether and polyethyl vinyl ether. Acrylic pressure sensitive adhesives are most preferred since they have the best balance of adhesive and cohesive properties for the present laminate. The thickness of the adhesive layer 7 will generally be in the range of from about 0.5 mil (0.013 mm.) to about 2.0 mils (0.05 mm.).

If the laminate of the present invention is to be manufactured at one location and used at another location, a release liner 8 is preferably affixed to the side of the pressure sensitive layer 7 which is furthest removed from film 1. The release liner 8 may be any of the release liners known to persons of ordinary skill in the art of making pressure sensitive products including removable, water soluble protective coatings, and the like. One preferred liner material is silicone coated release paper having a thickness of from about 2.0 mils (0.05 mm.) to about 12 mils (0.3 mm.). Of course, if the film/adhesive composite is to be manufactured and applied to a desired substrate at the same manufacturing location, a release liner may not be needed.

A preferred process for affixing the combination containing the film 1 and the pressure sensitive adhesive 7 and release liner 8 comprises transfer coating. In such a process, a fluid solution of the adhesive 7 is applied to the release liner 8, and the resulting composite is heated to dry the adhesive layer 7. The adhesive side of this adhesive/liner laminate is then laminated to the exposed surface of the protective layer 6 at a conventional lamination nip to form the product shown in FIG. 4.

When the laminate of the present invention is to be used, the adhesive layer 7 is brought into contact with a desired substrate and, when properly positioned, pressure is applied to securely affix it to a desired substrate, e.g., a motor vehicle.

The Example which follows illustrates certain preferred embodiments of the present invention.

EXAMPLE

The Example illustrates how one product of the present invention was made under laboratory conditions.

A transparent polyvinyl chloride (PVC) exterior grade film having a thickness of about 3 mils (0.07 mm.) was laminated to a release coated polyester film which had been metallized followed by coating of the metallized surface with a clear, light stable, heat activatable adhesive ("No. 9353 Chromtex Smooth Gold 78 with 840 adhesive", available from Kurz-Hastings, Inc., Philadelphia, Pa.). This metallized transfer laminate was 0.8 mils (0.02 mm.) in thickness and had its adhesive side laminated to the matte or dull side of the PVC film by passing both films over a series of heated drums. This raised the temperature of the heat activatable adhesive to about 270° F. (135° C.) for proper activation and formation of a satisfactory bond of the metallized transfer laminate to the PVC film. The polyester film was then removed from the transfer laminate leaving a PVC film/adhesive/metal layer/release coated intermediate structure.

In order to satisfactorily bond pressure sensitive adhesive and release paper to the release coated side of the structure resulting from the previous steps, approximately 0.2 mil (0.005 mm.) of a polyurethane polymer tiecoat was applied to the release coating. The polyurethane polymer that was used was a fully reacted polyurethane polymer supplied as a solution in toluene and isopropanol (available as "Milloxane LS-516" from Millmaster Onyx). After the tiecoat layer was allowed to dry by being heated at 70° C. for 30 sec., a layer of about 1 mil (0.025 mm.) of pressure sensitive adhesive was applied to the tiecoat layer by means of a conventional transfer technique. The adhesive that was used herein was a high molecular weight thermoplastic acrylic terpolymer, which is available as "Durotak 80-1053" from National Starch and Chemical Corp. In such a technique, the wet adhesive is coated directly onto release paper at a thickness of about 3 mils (0.076 mm.) followed by evaporation of the solvent by heating at 100° C. for 2 minutes. This is followed by lamination of the dried adhesive to the tie coat layer by passing the adhesive/release liner laminate and the PVC containing laminate through a laminating nip.

After lamination, a high level of adhesion was exhibited between the layer of pressure sensitive adhesive and tie coat. The resulting laminate is useful as a metallized film for such and uses as automobile trim.

The above Example shows a preferred embodiment of the present invention and should not be construed in a limiting sence. The scope of protection that is sought is given in the claims which follow.

What is claimed:

1. A method of forming a decorative film laminate which comprises a substantially transparent plastic film, a thin continuous metallic layer adhesively attached to one side of the plastic film, and a layer of pressure sensitive adhesive attached to the thin continuous metallic layer on the side of said metallic layer that is remote from the side attached to the plastic film, said method comprising:
    (a) adhesively attaching a metallized transfer laminate to one side of the substantially transparent plastic film, said transfer laminate having the thin continuous metallic layer attached to a carrier film;
    (b) stripping the carrier film from the product resulting from Step (a); and
    (c) attaching a layer of pressure sensitive adhesive to the side of the metallic layer which is remote from the side attached to the substantially transparent film.

2. A method as claimed in claim 1 which further comprises applying a resinous tie coat to the product resulting from step (b) prior to application of the layer of pressure sensitive adhesive.

3. A method as claimed in claim 1 wherein the pressure sensitive adhesive is attached to a release liner when attached to the metallic layer.

* * * * *

UNITED STATES PATENT AND TRADEMARK OFFICE
CERTIFICATE OF CORRECTION

PATENT NO. : 4,330,352
DATED : May 18, 1982
INVENTOR(S) : Whiteford D. Grimes et al.

It is certified that error appears in the above-identified patent and that said Letters Patent are hereby corrected as shown below:

Col. 4, line 6, "$C_9$-$C_{12}$" should be -- $C_4$-$C_{12}$ --; and

Col. 4, line 51, "The" should be -- This --.

Signed and Sealed this

Tenth Day of August 1982

[SEAL]

Attest:

GERALD J. MOSSINGHOFF

Attesting Officer     Commissioner of Patents and Trademarks